US011726209B2

(12) United States Patent
Bergmann et al.

(10) Patent No.: US 11,726,209 B2
(45) Date of Patent: Aug. 15, 2023

(54) ARTIFACT FILTERING USING ARTIFICIAL INTELLIGENCE

(71) Applicant: FARO Technologies, Inc., Lake Mary, FL (US)

(72) Inventors: Louis Bergmann, Stuttgart (DE); Vadim Demkiv, Korntal-Münchingen (DE); Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 259 days.

(21) Appl. No.: 16/893,849

(22) Filed: Jun. 5, 2020

(65) Prior Publication Data
US 2020/0410293 A1  Dec. 31, 2020

Related U.S. Application Data

(60) Provisional application No. 62/866,258, filed on Jun. 25, 2019.

(51) Int. Cl.
*G06K 9/62* (2022.01)
*G06K 9/00* (2022.01)
(Continued)

(52) U.S. Cl.
CPC .......... *G01S 17/89* (2013.01); *G06F 18/2148* (2023.01); *G06V 10/30* (2022.01);
(Continued)

(58) Field of Classification Search
CPC ............... G06K 9/6257; G06K 9/6231; G06V 10/7747; G06V 30/19147; G06V 20/64;
(Continued)

(56) References Cited

U.S. PATENT DOCUMENTS 8,705,012 B2  4/2014 Greiner et al.
9,754,419 B2 * 9/2017 Petrovskaya .......... G02B 27/01
(Continued)

FOREIGN PATENT DOCUMENTS

EP          3477583 A1    5/2019

OTHER PUBLICATIONS

Schauer J, Nüchter A. The peopleremover—removing dynamic objects from 3-d point cloud data by traversing a voxel occupancy grid. IEEE robotics and automation letters. Feb. 5, 2018;3(3):1679-86. (Year: 2018)*
Extended European Search Report for Application 20181942.2 dated Oct. 26, 2020; 10 pgs.

*Primary Examiner* — Edward F Urban
*Assistant Examiner* — Duy Tran
(74) *Attorney, Agent, or Firm* — McCarter & English, LLP; Dave S. Christensen; David K. Kincaid

(57) ABSTRACT

A system and a method for removing artifacts from a 3D coordinate data are provided. The system includes one or more processors and a measuring device. The one or more processors are operable to receive training data and train the 3D measuring device to identify artifacts by analyzing the training data. The one or more processors are further operable to identify artifacts in live data based on the training of the processor system. The one or more processors are further operable to generate clear scan data by filtering the artifacts from the live data and output the clear scan data.

19 Claims, 6 Drawing Sheets
(1 of 6 Drawing Sheet(s) Filed in Color)

(51) Int. Cl.
*G06K 9/52* (2006.01)
*G01S 17/89* (2020.01)
*G06V 20/64* (2022.01)
*G06V 10/30* (2022.01)
*G06F 18/214* (2023.01)

(52) U.S. Cl.
CPC ............ *G06V 20/64* (2022.01); *G06V 20/647* (2022.01); *G06V 2201/121* (2022.01)

(58) Field of Classification Search
CPC .... G06V 20/647; G06V 20/653; G06V 20/80; G06V 10/42; G06V 30/186; G06V 30/164; G06V 10/30; G06V 2201/121
See application file for complete search history.

(56) References Cited

U.S. PATENT DOCUMENTS

| | | | |
|---|---|---|---|
| 2010/0303341 A1* | 12/2010 | Hausler | A61B 5/1079 382/154 |
| 2012/0194516 A1* | 8/2012 | Newcombe | G06T 17/00 345/420 |
| 2014/0368493 A1* | 12/2014 | Rogan | G01S 17/50 345/419 |
| 2018/0040119 A1 | 2/2018 | Trenholm et al. | |
| 2018/0188045 A1* | 7/2018 | Wheeler | G06F 18/24 |
| 2018/0205926 A1* | 7/2018 | Mogalapalli | H04N 13/122 |
| 2019/0178643 A1 | 6/2019 | Metzler et al. | |

\* cited by examiner

ARTIFACT FILTERING USING ARTIFICIAL INTELLIGENCE

CROSS REFERENCE TO RELATED APPLICATIONS

This application claims the benefit of U.S. Provisional Application Ser. No. 62/866,258 filed Jun. 25, 2019, the entire disclosure of which is incorporated herein by reference.

BACKGROUND

The subject matter disclosed herein relates to use of a three-dimensional ("3D") measurement device, such as a laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A time-of-flight (TOF) laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer). As a result of the scan, a collection of 3D coordinates is generated for points on surfaces in the environment. This collection of 3D coordinates is sometimes referred to as a "point cloud." In many applications, multiple scans may be performed in an environment to acquire the desired measurements.

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

When generating the point cloud, artifacts (i.e., aberrations) can be unintendedly captured by the TOF scanner. This may occur for example, when one or more scans are performed with an area of overlap. If an object moves (e.g. a person within the field of view of the scanner) within the area of overlap between the scans, an artifact (e.g. the person) will be in one scan but not the other. Removing artifacts from the point cloud is usually performed in a manual operation. Having individuals correct the resulting point cloud is therefore tedious and time consuming.

Accordingly, while existing 3D scanners are suitable for their intended purposes, what is needed is a 3D scanner having certain features of embodiments of the present invention.

BRIEF SUMMARY OF THE INVENTION

According to one embodiment, a system having a three-dimensional (3D) measuring device is provided. The system includes one or more processors. The measuring device includes a scanner controller, a camera and an artificial intelligence (AI) module. The processors are operable to receive training data and be trained to identify artifacts by analyzing the training data. The processors are further operable to identify artifacts in live data based on the training. The processor system is further operable to generate clear scan data by filtering the artifacts from the live data and output the clear scan data.

In addition to one or more of the features described herein, or as an alternative, further embodiments of the system may include the 3D measuring device further having a light source and a camera. In addition to one or more of the features described herein, or as an alternative, further embodiments of the system may provide the training to identify the artifacts to include associating patterns with known moving objects.

In addition to one or more of the features described herein, or as an alternative, further embodiments of the system may provide the identifying of the artifacts includes identifying one or more of the patterns of known moving object in the live data. In addition to one or more of the features described herein, or as an alternative, further embodiments of the system may provide the generating clear scan data to include removing a third 3D coordinate data from the live data, the third 3D coordinate data comprising data points in the identified one or more patterns.

In addition to one or more of the features described herein, or as an alternative, further embodiments of the system may include the one or more processors being integral with the 3D measuring device.

According to another embodiment, a method for generating clear 3D coordinate scan of an environment or object is provided. The method comprising: receiving, by one or more processors associated with a 3D coordinate scanner, training data, training, by the processors, to identify artifacts by analyzing the training data, identifying, by the processors, artifacts in live data based on the training of the scanner, generating, by the processors, clear 3D coordinate data by filtering the artifacts from the live data and outputting, by the processors, the clear 3D coordinate data.

In addition to one or more of the features described herein, or as an alternative, further embodiments of the method may include the 3D measuring device further having a light source and a camera. In addition to one or more of the features described herein, or as an alternative, further embodiments of the method may provide that the training to identify the artifacts includes associating patterns with known moving objects.

In addition to one or more of the features described herein, or as an alternative, further embodiments of the method may provide that the identifying of the artifacts includes identifying one or more of the patterns of known moving objects in the live data. In addition to one or more of the features described herein, or as an alternative, further embodiments of the method may provide that the generating clear scan data includes removing a third 3D coordinate data from the live data, the third 3D coordinate data comprising data points in the one or more identified patterns.

In addition to one or more of the features described herein, or as an alternative, further embodiments of the method may include the one or more processors being integral with the 3D measuring device.

According to another embodiment, a computer readable storage medium for generating clear 3D coordinate scan is provided. The computer readable storage medium comprising: receiving training data, training to identify artifacts by analyzing the training data, identifying artifacts in live data based on the training of one or more processors associated with a 3D measuring device, generating clear 3D coordinate data by filtering the artifacts from the live data and outputting the clear 3D coordinate data.

In addition to one or more of the features described herein, or as an alternative, further embodiments of the computer readable medium may include the 3D measuring device further having a light source and a camera. In addition to one or more of the features described herein, or as an alternative, further embodiments of the computer readable medium may provide that the training to identify the artifacts includes associating patterns with known moving objects.

In addition to one or more of the features described herein, or as an alternative, further embodiments of the computer readable medium may provide that the identifying of the artifacts includes identifying one or more of the patterns of known moving objects in the live data. In addition to one or more of the features described herein, or as an alternative, further embodiments of the computer readable medium may provide that the generating clear scan data includes removing a third 3D coordinate data from the live data, the third 3D coordinate data comprising data points in the one or more identified patterns.

In addition to one or more of the features described herein, or as an alternative, further embodiments of the computer readable medium may include the one or more processors being integral with the 3D measuring device.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a system having a three-dimensional ("3D") measuring device and one or more processors. Embodiments of the invention provide advantages in generating clear 3D coordinate data generated by filtering artifacts in 3D coordinate data that are created by objects moving while an area is being scanned (e.g., dynamic objects, humans or cars).

Figure 1:
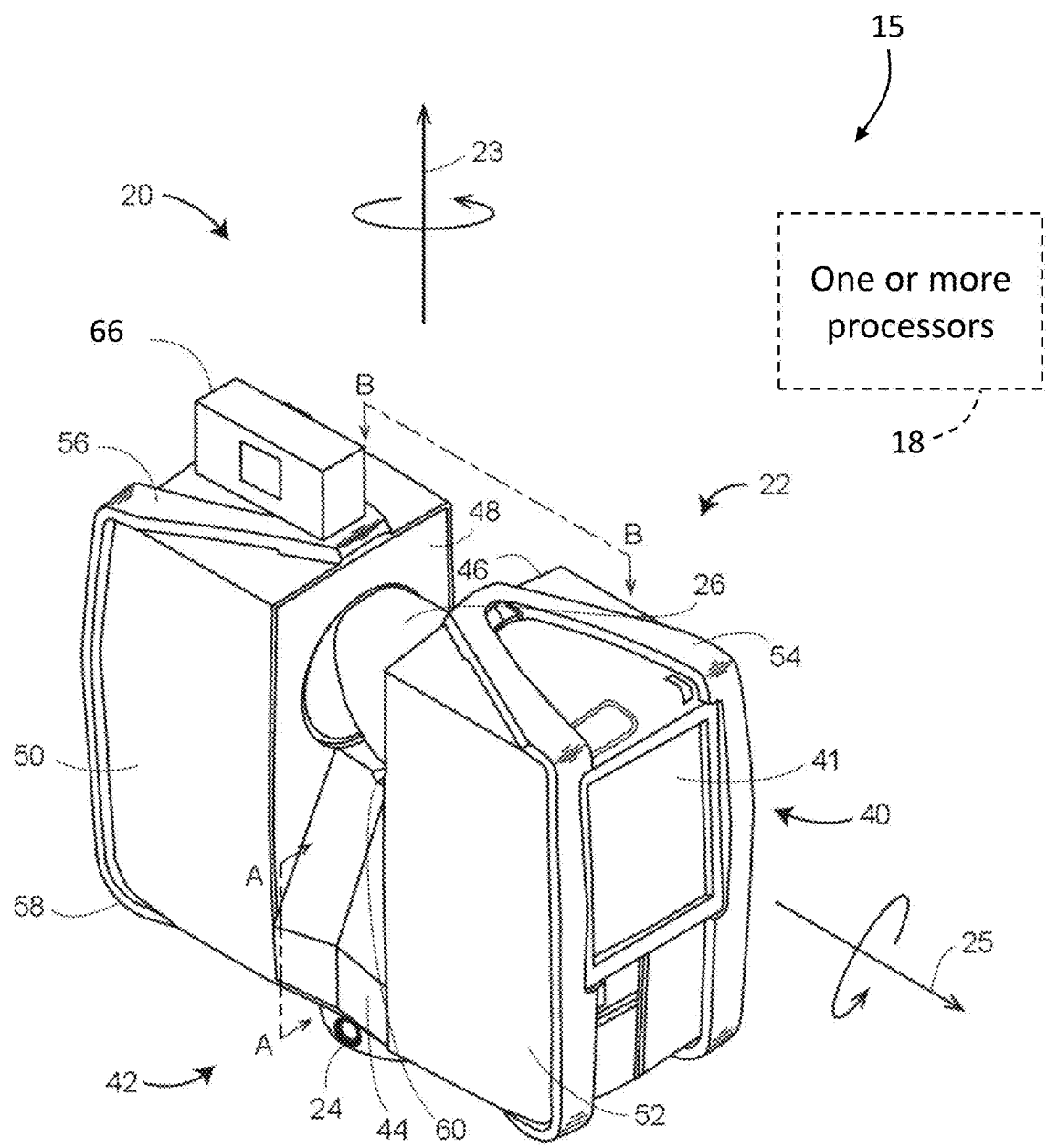
FIG. 1 is a perspective view of a laser scanner in accordance with an embodiment of the invention.
Figure 2:
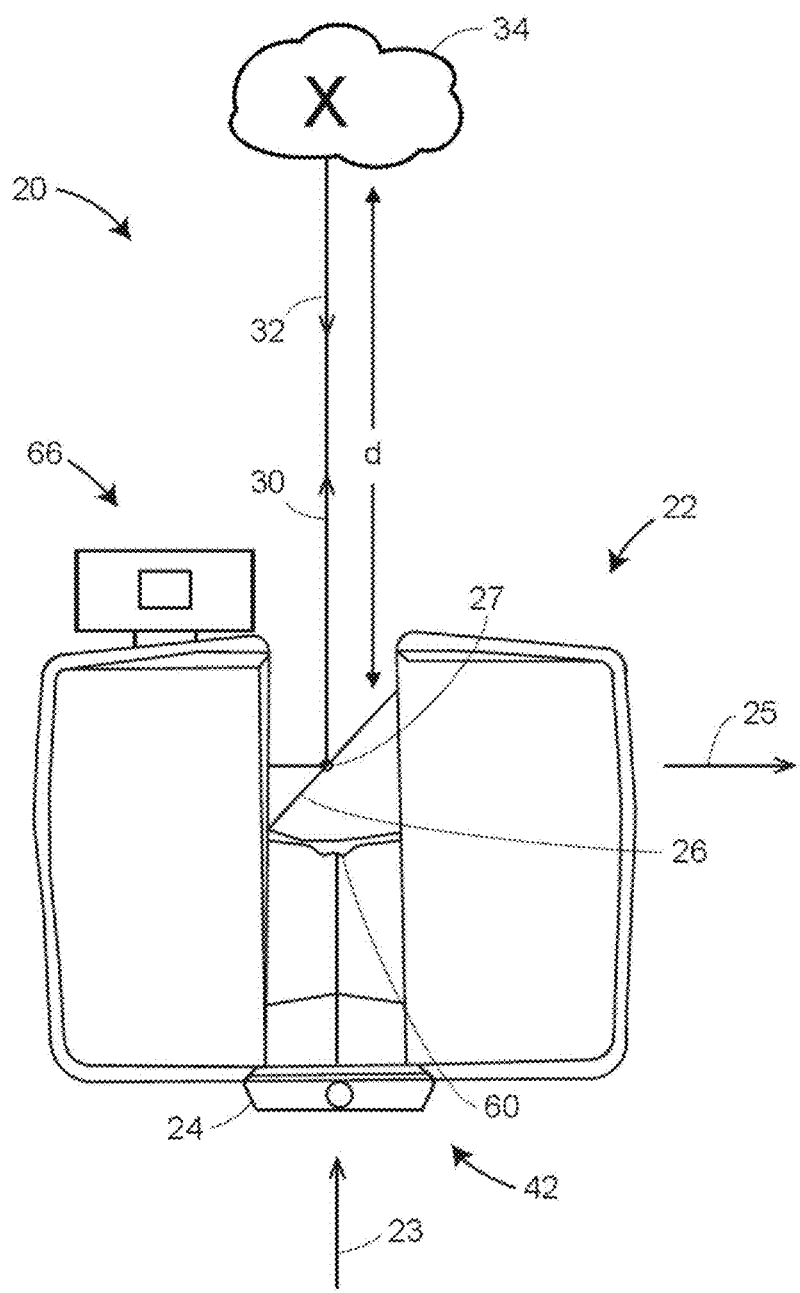
FIG. 2 is a side view of the laser scanner illustrating a method of measurement according to an embodiment.
Figure 3:
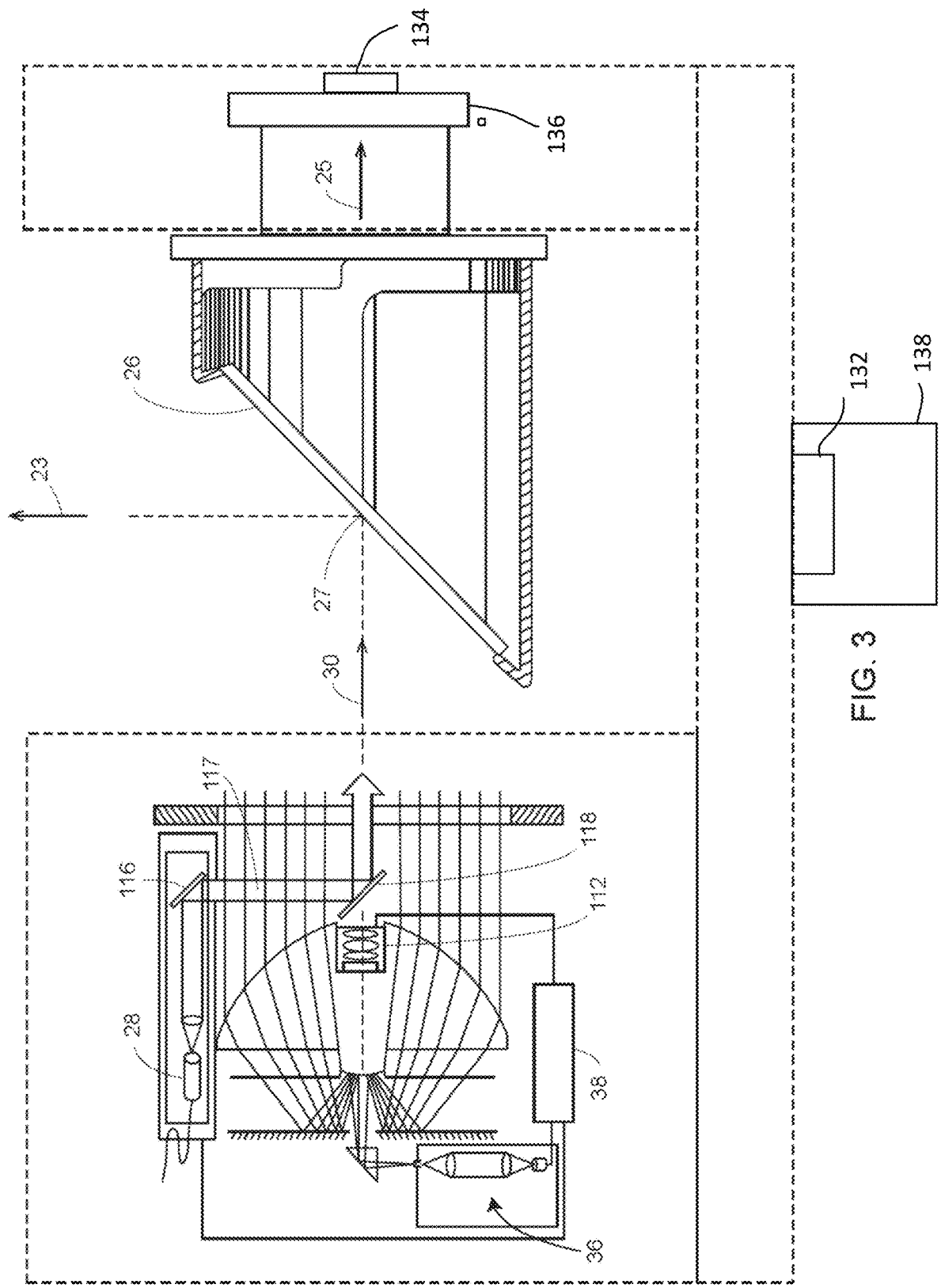
FIG. 3 is a schematic illustration of the optical, mechanical, and electrical components of the laser scanner according to an embodiment.

Referring now to FIGS. 1-3, a system 15 having a laser scanner 20 is shown for optically scanning and measuring the environment surrounding the laser scanner 20. In an embodiment, the system 15 may include one or more processors 18 that are coupled for communication to the laser scanner 20. In an embodiment, the one or more processors 18 are integral with the laser scanner 20. The one or more processors 18 are responsive to non-transitory executable computer instructions for performing operational methods such as those described herein. As will be described in more detail herein, the one or more processors 18 are configured to identify patterns in 3D coordinated data that correspond with moving or dynamic objects and automatically remove 3D coordinate points associated with the identified patterns to generate a second or clean 3D coordinate data.

The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment, the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the graphical touch screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes an arm portion 58 that is coupled, such as with a fastener for example, to the traverse member 44 adjacent the base 24. The arm portion 58 for each yoke 54, 56 extends from the traverse member 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse member 44, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse member 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse member 44. When the mirror 26 rotates, during each rotation the mirror 26 directs the emitted light beam 30 onto the traverse member 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera or digital camera 112 (e.g. first image acquisition device) is located internally to the scanner and may have the same optical axis as the 3D scanner device. In this embodiment, a first image acquisition device, such as digital camera 112, is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different from the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
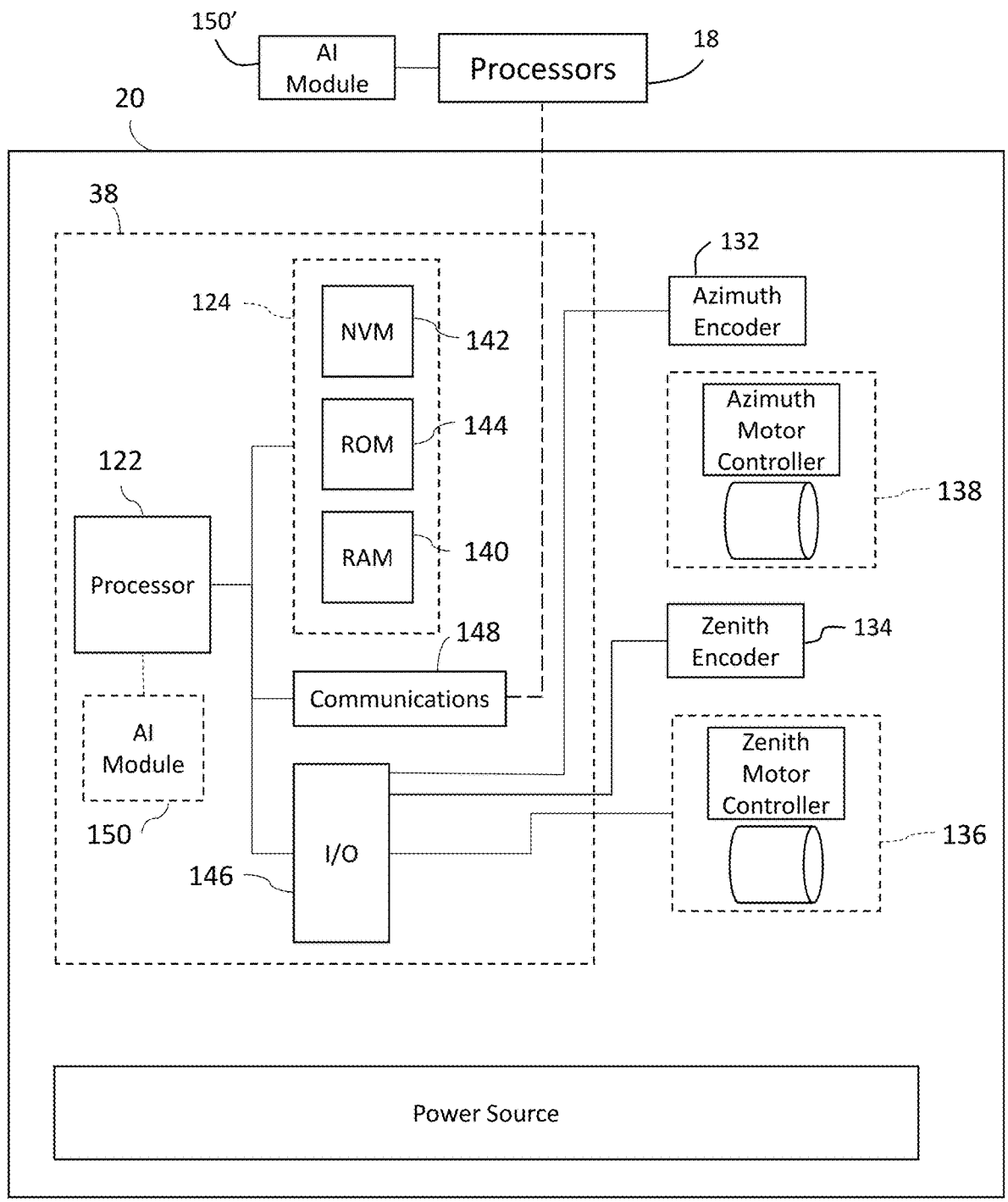
FIG. 4 illustrates a schematic illustration of the laser scanner of FIG. 1 according to an embodiment.

Referring now to FIG. 4 with continuing reference to FIGS. 1-3, elements are shown of the laser scanner 20. Scanner controller 38 is a suitable electronic device capable of accepting data and instructions, executing the instructions to process the data, and presenting the results. The scanner controller 38 includes one or more processing elements 122. The processors may be microprocessors, field programmable gate arrays (FPGAs), digital signal processors (DSPs), and generally any device capable of performing computing functions. The one or more processor elements 122 have access to memory 124 for storing information. In an embodiment, the one or more processors 18 may be integral with the processor elements 122. In an embodiment, the scanner controller 38 may also include an artificial intelligence (AI) module 150.

Scanner controller 38 is capable of converting the analog voltage or current level provided by light receiver 36 into a digital signal to determine a distance from the laser scanner 20 to an object in the environment. Scanner controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, scanner controller 38 accepts data from encoders 132, 134, light receiver 36, light emitter 28, and panoramic camera 126 and is given certain instructions for the purpose of generating a 3D point cloud of a scanned environment. Scanner controller 38 provides operating signals to the light emitter 28, light receiver 36, panoramic camera 126, zenith motor 136 and azimuth motor 138. The scanner controller 38 compares the operational parameters to predetermined variances and if the predetermined variance is exceeded, generates a signal that alerts an operator to a condition. The data received by the scanner controller 38 may be displayed on a user interface or display device 40 coupled to scanner controller 38. The user interface 41 may be one or more LEDs (light-emitting diodes) 82, an LCD (liquid-crystal diode) display, a CRT (cathode ray tube) display, a touch-screen display or the like. A keypad may also be coupled to the user interface for providing data input to scanner controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The scanner controller 38 may also be coupled to external computer networks such as a local area network (LAN) and the Internet. A LAN interconnects one or more remote computers, including one or more processors 18, which are configured to communicate with scanner controller 38 using a well-known computer communications protocol such as TCP/IP (Transmission Control Protocol/Internet(^) Protocol), RS-232, ModBus, and the like. Additional scanners 20 may also be connected to LAN with the scanner controllers 38 in each of these scanners 20 being configured to send and receive data to and from remote computers and other scanners 20. The LAN may be connected to the Internet. This connection allows scanner controller 38 to communicate with one or more remote computers connected to the Internet.

The processor elements 122 are coupled to memory 124. The memory 124 may include random access memory (RAM) device 140, a non-volatile memory (NVM) device 142, and a read-only memory (ROM) device 144. In addition, the processor elements 122 may be connected to one or more input/output (I/O) controllers 146 and a communications circuit 148. In an embodiment, the communications circuit 92 provides an interface that allows wireless or wired communication with one or more external devices, or networks, such as the LAN discussed above, or to the one or more processors 18.

Scanner controller 38 includes operation control methods embodied in application code. These methods are embodied in computer instructions written to be executed by processor elements 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 6A:
FIG. 6A and FIG. 6B illustrate a point cloud that was generated by the laser scanner of FIG. 1 and analyzed using the method of FIG. 5.

It should be appreciated that movement within the area being scanned will cause artifacts or patterns within the acquired 3D coordinate data. Referring to FIG. 6A, a 3D coordinate data is shown for an interior area that was scanned by laser scanner 20. It should be noted that the 3D coordinate data is comprised of a plurality of individual 3D coordinate data points, sometimes colloquially referred to as a "point cloud" 600. Due to the lower number of points in the point cloud, depending on the scale of the image, the point cloud may appear to be a solid image. Within the point cloud 600 there are a number of artifacts that appear as patterns within the point cloud 600, such as patterns 602, 604, 606, 608, 610. These patterns 602, 604, 606, 608, 610 represent people within the area being scanned, that are moving while the scan is being performed. Since they are moving, rather than a scan of the person (which would occur if they remained still during the scan), a pattern is formed in the data. It has been found that movable objects (e.g. people, vehicles) commonly found in areas being scanned form identifiable patterns. In prior art systems, these patterns or artifacts in the 3D coordinate data was either manually removed or requires multiple overlapping scans that require time and computationally intensive comparisons of the scans to identify moving objects.

AI module 150, 150' can be used by the system 15 to identify and filter artifacts captured by the scanner 20 during one or more scans. It should be appreciated that while the embodiment of FIG. 4 illustrates two AI modules 150, 150' this is for example purposes and in embodiments, the scanners 20 may have one AI module coupled to the processors 18, the scanner 20, or a combination of the foregoing. In an embodiment, the AI module is a machine learning engine such as an artificial neural network inference engine or a deep learning engine for example. AI module aims to produce a machine that exhibits characteristics associated with human intelligence, such as language comprehension, problem solving, pattern recognition, learning, and reasoning from incomplete or uncertain information. The AI module 150 can filter artifacts or patterns associated with moved or moving objects (e.g., objects, people, cars, animals, etc.) captured within the one or more scans performed by laser scanner 20 after conducting a training phase.

During the training phase the AI module 150, 150' can use training data (i.e., a 2D panorama of scans including intensity and depth data or 3D coordinate data) to analyze overlapping areas of the 3D scans to identify moved or moving objects based on individual pixel differences occurring amongst the 2D image data. The AI module 150, 150' can also use the depth data to determine differences amongst the 2D image data. For moved or moving objects, changes in depth data amongst the 2D images can be drastic and/or repetitive. Any moving objects identified in the 2D images while in the training phase are designated as artifacts. In an embodiment, the AI module 150, 150' is an image classifier and the training data includes known labels for images that have been previously identified by a human analyst. In such an embodiment, the AI module 150 may be trained to recognize objects, such as a person, that are known to move and therefore would be tagged as an artifact. In another embodiment, the human analyst is supported by the AI module 150 that compares pairs of scans to determine where there is a moving object. This embodiment checks to determine if one scan can identify or locate behind points floating in the air which are captured by the other scan (e.g. points are visible in one scan but are blocked in a second scan). In an embodiment, the identification of the points is determined by ray tracing.

Figure 6B:

During an operational phase (i.e., normal operation of the scanner 20) the system 15 can use the artifact identification technique obtained during the training phase to recognize artifacts within current scans of an environment (i.e., live data), as well as filter the artifacts from the scans obtained by the scanner 20. Accordingly, the scanner 20 can generate or output a 3D coordinate data with the data points associated with the identified patterns removed (e.g. clear 3D coordinate data). The filter can be a mask having dimensions of an artifact, which can be adjusted based on the movement of the artifact. Because the system 15 has already been trained to identify artifacts, a comparison between separate scans (e.g. multiple scans performed in the same environment from multiple locations) to determine moving objects is not necessary. Further, in some embodiments, an overlap between separate scans is also not necessary. Additional live 3D coordinate data (i.e., additional data points from other scans) can be used to supplement a 3D coordinate data to further define the environment. In other words, when an artifact is determined, the 3D coordinate points associated with the artifact or pattern are removed from the point cloud. In an embodiment, the area of the point cloud where the artifact 3D coordinate data was removed may then be supplemented or filled-in with 3D coordinate data of that area that was obtained when the artifact was not present during the scan (e.g. a second scan). In the embodiment of FIG. 6A and 6B, the initial point cloud 600 generated by scanner 20 included several artifacts or patterns 602, 604, 606, 608, 610. After removing the points associated with the artifacts, a second point cloud 612 is generated as shown in FIG. 6B.

Figure 5:
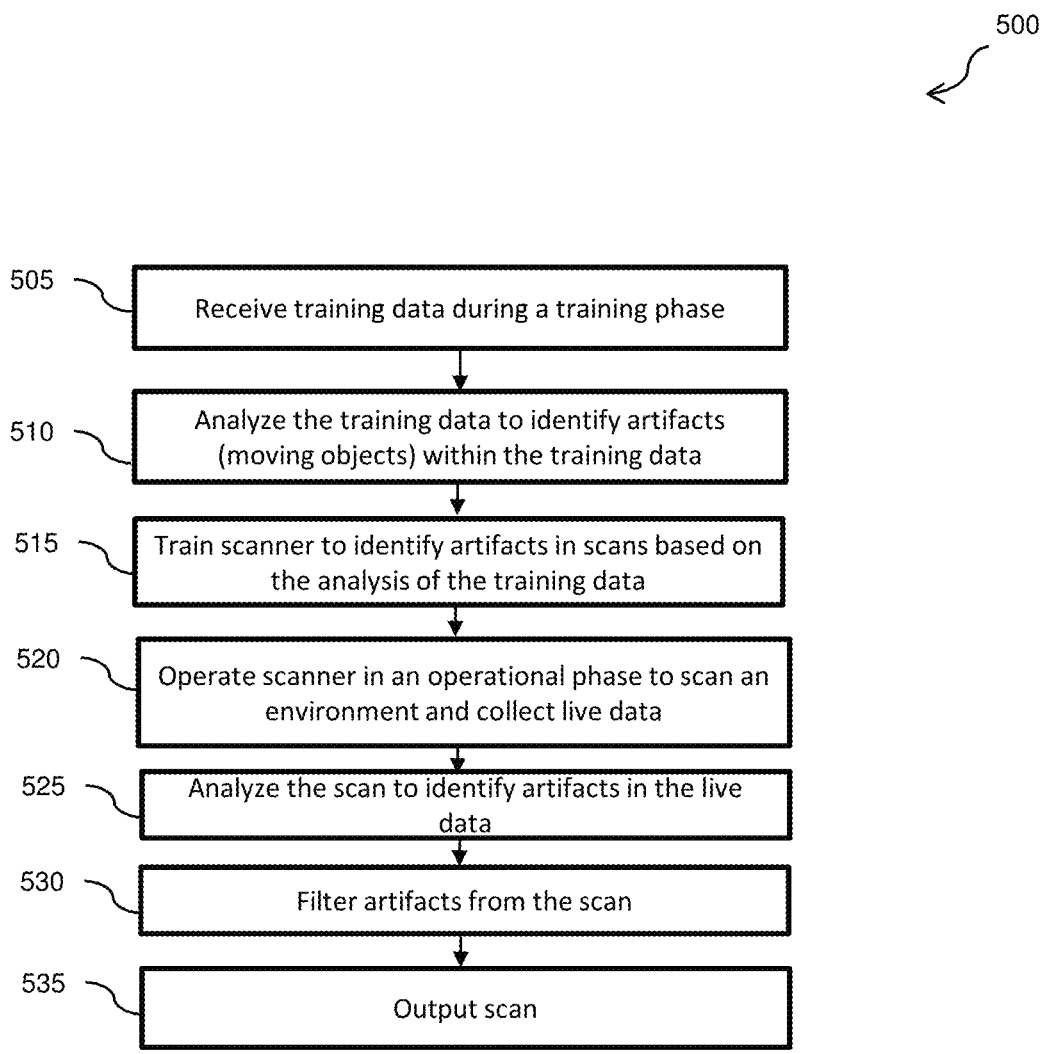
FIG. 5 depicts a flow diagram of a method for generating clear scan data by identifying and filtering artifacts from scan data according to one or more embodiments.

FIG. 5 depicts a flow diagram of a method 500 for implementing a method for generating clear scan data by identifying and filtering artifacts 602, 604, 606, 608, 610 from scan data or point cloud 600 according to one or more embodiments. At block 505, one or more processors 18, during a training phase, can receive training data. The received data can be a 2D panorama images of scans where the pixels of the image including intensity and depth data, or can include 3D coordinate data. At block 510, the one or more processors 18 analyze the training data using AI to identify artifacts within the training data. The artifacts can be related to moving objects captured in one or more images taken by a camera associated with the scanner 20. In an embodiment, the artifacts can be related to moving objects based on 3D coordinate data that had been processed by a human analyst to remove undesired patterns from moving objects. At block 515, the one or more processors 18 can be trained to identify artifacts in live data based on the analysis of the training data by the one or more processors.

At block 520, the scanner 20 is used in normal operation to scan an environment and collect 3D coordinate data (referred to herein as "live 3D coordinate data"). At block 525, the trained one or more processors 18 analyze a scan data to identify one or more artifacts in the live data. At block 530, the one or more processors 18 filter the artifacts in the live data to remove artifacts from the 3D coordinate scan data to generate clear 3D coordinate scan data. At block 535, the scanner 20 can output the clear 3D coordinate scan data.

Accordingly, the embodiments disclosed herein describe a system that can generate clear 3D coordinate scan data by filtering artifacts from live 3D coordinate scan data based on training of a system to identify artifacts in training data. Embodiments disclosed provide a technical effect of removing regions of 3D coordinate points in scan data related to moving objects captured in the 3D coordinate scan data by using an AI module that has been trained to filter out artifacts from scans. The AI module learns how to recognize artifacts and can then filter such artifacts from any given scan without relying on overlapping scan data. The AI module predicts artifacts by marking such regions. Points of the marked regions can then be deleted.

It should be appreciated that while embodiments herein describe the removal of artifacts from a 3D point cloud generated by a phase-shift TOF laser scanner, this is for example purposes and the claims should not be so limited. In other embodiments, the 3D coordinate data or point cloud may be generated by any type of 3D measurement device, such as but not limited to a pulsed TOF laser scanner, frequency modulated continuous wave (FMCW) scanner, triangulation scanner, an area scanner, a structured light scanner, a laser line probe, a laser tracker, or a combination of the foregoing.

It should be appreciated that while 3D coordinate data may be used for training, the methods described herein for removing artifacts may be used with either two-dimensional or three-dimensional data sets.

Technical effects and benefits of the disclosed embodiments include, but are not limited to, increasing scan quality and a visual appearance of scans acquired by the 3D coordinate measurement device.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
one or more processors; and
a 3D measuring device operably coupled to the one or more processors, the 3D measuring device comprising:
an artificial intelligence (AI) module;
wherein the one or more processors are operable to:
  receive training data used to train the AI module, the AI module comprising an image classifier;
  train the AI module to identify a pattern by analyzing the training data according to changes in depth data, the training data including first 3D coordinate data, the pattern comprising an incomplete representation of an object that is moving during an acquisition of the first 3D coordinate data, the training data input to the AI module having labels that designate the pattern comprising changes in the depth data;
  identify, using the AI module having been trained, the pattern according to changes in the depth data in live data received from the 3D measuring device based on the training of the one or more processors, the live data including second 3D coordinate data;
  generate clear scan data by filtering the pattern having been identified according to changes in the depth data from the live data; and
  output the clear scan data.

2. The system of claim 1, wherein the 3D measuring device further includes a light source and a camera.

3. The system of claim 1, wherein the training to identify the pattern includes associating patterns with known moving objects.

4. The system of claim 3, wherein the identifying of the pattern includes identifying one or more of the patterns of known moving object in the live data.

5. The system of claim 4, wherein the generating clear scan data includes removing a third 3D coordinate data from the live data, the third 3D coordinate data comprising data points in the identified one or more patterns.

6. The system of claim 1, wherein the one or more processors are integral with the 3D measuring device.

7. A method for generating clear scan data comprising:
receiving, by one or more processors, training data used to train an artificial intelligence (AI) module, the AI module comprising an image classifier;
training, by the one or more processors, the AI module to identify a pattern by analyzing the training data according to changes in depth data, the pattern comprising an incomplete representation of an object that is moving during an acquisition of the first 3D coordinate data, the training data input to the AI module having labels that designate the pattern comprising changes in the depth data;
identifying, using the AI module having been trained, the pattern according to changes in the depth data in live data generated by a 3D measuring device based on the training of the one or more processors;
generating, by the one or more processors, clear scan data by filtering the pattern having been identified according to changes in the depth data from the live data; and
outputting, by the one or more processors, the clear scan data.

8. The method of claim 7, wherein the 3D measuring device further includes a light source and a camera.

9. The method of claim 7, wherein the training to identify the pattern includes associating patterns with known moving objects.

10. The method of claim 9, wherein the identifying of the pattern includes identifying one or more of the patterns of known moving objects in the live data.

11. The method of claim 10, wherein the generating clear scan data includes removing a third 3D coordinate data from the live data, the third 3D coordinate data comprising data points in the one or more identified patterns.

12. The method of claim 7, wherein the one or more processors are integral with the 3D measuring device.

13. A non-transitory computer readable medium having program instructions embodied therewith, the program instructions readable by one or more processors to cause the one or more processors to perform a method for generating clear scan data comprising:
receiving training data of 3D coordinate data used to train an artificial intelligence (AI) module, the AI module comprising an image classifier;
training the AI module to identify a pattern by analyzing the training data according to changes in depth data, the pattern comprising an incomplete representation of an object that is moving during an acquisition of the first 3D coordinate data, the training data input to the AI module having labels that designate the pattern comprising changes in the depth data;
identifying, using the AI module having been trained, the pattern according to changes in the depth data in live data generated by a 3D measuring device based on the training of the one or more processors;
generating with the one or more processors a clear scan data by filtering the pattern having been identified according to changes in the depth data from the live data; and
outputting with the one or more processors the clear scan data.

14. The computer readable medium of claim 13, wherein the 3D measuring device further includes a light source and a camera.

15. The computer readable medium of claim 13, wherein the training to identify the pattern includes associating patterns with known moving objects.

16. The computer readable medium of claim 15, wherein the identifying of the pattern includes identifying one or more of the patterns of known moving objects in the live data.

17. The computer readable medium of claim 16, wherein the generating clear scan data includes removing a third 3D coordinate data from the live data, the third 3D coordinate data comprising data points in the one or more identified patterns.

18. The computer readable medium of claim 13, wherein the one or more processors are integral with the 3D measuring device.

19. The system of claim 1, wherein a background object is viewable through the pattern of the incomplete representation.

\* \* \* \* \*